United States Patent [19]

Ebisawa

[11] Patent Number: 5,277,378
[45] Date of Patent: Jan. 11, 1994

[54] NUMERICALLY CONTROLLED TAPE TAKEUP SYSTEM HAVING DEVICE FOR AUTOMATIC CALIBRATION OF CONVERSION FORMULA

[75] Inventor: Ryoji Ebisawa, Kanagawa, Japan

[73] Assignee: Fuji Photo Film Co. Ltd., Kanagawa, Japan

[21] Appl. No.: 7,744

[22] Filed: Jan. 22, 1993

[30] Foreign Application Priority Data

Feb. 18, 1992 [JP] Japan .................................. 4-30523

[51] Int. Cl.⁵ ...................... B65H 77/00; G11B 15/43
[52] U.S. Cl. .................. 242/190; 242/75.51; 318/7
[58] Field of Search ...................... 242/190, 75.51, 189, 242/186; 360/73.08, 74.3; 318/6, 7

[56] References Cited

U.S. PATENT DOCUMENTS

| | | | |
|---|---|---|---|
| 4,015,799 | 4/1977 | Koski et al. | 242/203 |
| 4,398,227 | 8/1983 | Anderson | 360/71 |
| 4,786,992 | 11/1988 | Tajima et al. | 360/73 |
| 4,977,466 | 12/1990 | Nakata | 242/186 |
| 5,216,556 | 6/1993 | Steinberg et al. | 242/189 X |
| 5,222,684 | 6/1993 | Yoneda et al. | 242/186 |

FOREIGN PATENT DOCUMENTS 3-80456  4/1991  Japan .

Primary Examiner—Daniel P. Stodola
Assistant Examiner—John F. Rollins
Attorney, Agent, or Firm—Sughrue, Mion, Zinn Macpeak & Seas

[57] ABSTRACT

A tape takeup system includes a tensiometer which outputs a numerical value which changes in proportion to the tension applied to the tape. The numerical value is converted into a value of tension according to a predetermined formula. The rotational torque of the takeup reel is controlled so that the tension applied to the tape converges on a target tension on the basis of comparison of the value of tension represented by the numerical value output from the tensiometer and the target tension. When a known tension is applied to the tape, the value of the known tension and the numerical value which is output from the tensiometer upon application of the known tension are stored in a memory, and the predetermined formula is changed on the basis of the value of the known tension and the numerical value corresponding to the known tension stored in the memory. When a first switch is depressed, the torque control is interrupted, and a second switch is depressed, the change of the formula is permitted. When a third switch is depressed, the control of the rotational torque is resumed.

1 Claim, 7 Drawing Sheets

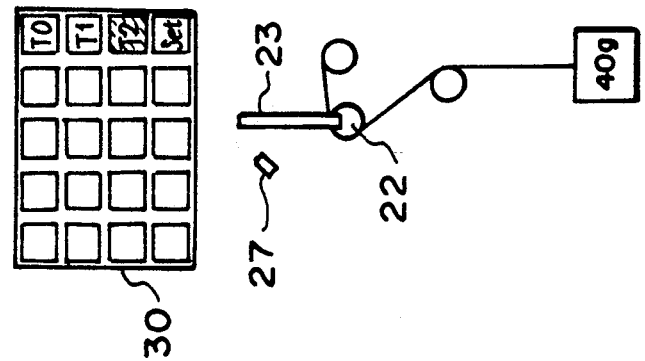
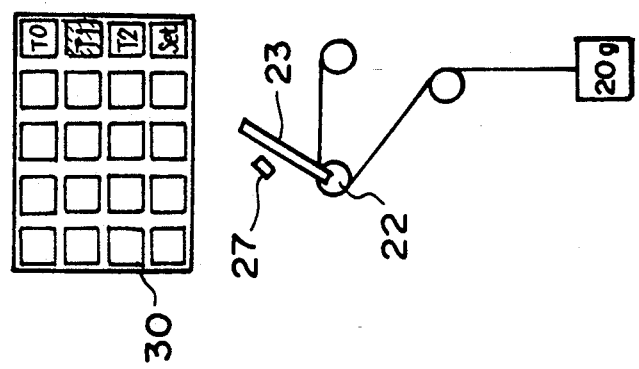
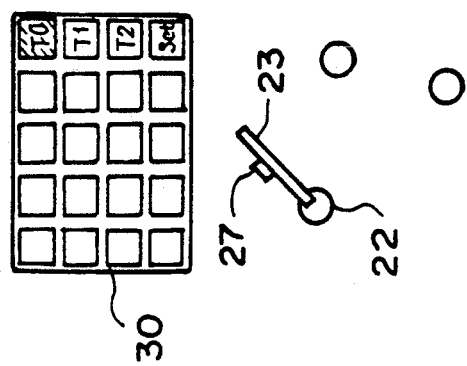

| CHANGE IN STATE | | | | | OUTPUT PULSE |
|---|---|---|---|---|---|
| A-PHASE | B-PHASE | → | A-PHASE | B-PHASE | |
| L | L | | H | L | UP |
| L | L | | L | H | DOWN |
| H | L | | H | H | UP |
| H | L | | L | L | DOWN |
| L | H | | L | L | UP |
| L | H | | H | H | DOWN |
| H | H | | L | H | UP |
| H | H | | H | L | DOWN |

NUMERICALLY CONTROLLED TAPE TAKEUP SYSTEM HAVING DEVICE FOR AUTOMATIC CALIBRATION OF CONVERSION FORMULA

BACKGROUND OF THE INVENTION

1. Field of the Invention

This invention relates to a tape takeup system for taking up tape in continuous length while controlling the tension applied to the tape.

2. Description of the Prior Art

As a tape takeup system which is used for slitting tape like magnetic tape in continuous length, or for rewinding such tape, there has been known one in which the speed of the tape feed roll is controlled and at the same time the torque of the takeup roll is controlled to control the tension applied to the tape.

In order to control the tension on the tape, the tension presently applied to the tape must be detected. As a tensiometer for detecting the tension on tape, there has been known one disclosed in Japanese Unexamined Patent Publication No. 3(1991)-80456. As shown in FIG. 9, the tensiometer comprises a tension detecting roller 2 around which a tape 1 is passed, a tension arm 3 one end of which is supported for rotation on the tension detecting roller 2 at the center thereof and the other end of which is fixed to an angle detecting device 4 at the center thereof, and a spring 5 which urges downward the tension arm 3.

When the tension applied to the tape 1 while the tape 1 is running increases, the tension detecting roller 2 is moved upward overcoming the force of the spring 5, and the tension arm 3 rotates the angle detecting device 4 in the direction of arrow A. The angle detecting device 4 detects the angle by which it is rotated and outputs a detecting signal to a tension control section. When the tension applied to the tape 1 reduces, the members move in the reverse direction and the angle detecting device 4 detects the angle by which it is rotated in the direction opposite to the arrow A and outputs a detecting signal to the tension control section.

In such a tensiometer, the relation between the actual tension applied to the tape 1 and the level of the detecting signal of the angle detecting device 4 is as shown by the curves in FIG. 10. That is, depending on the initial length of the spring 5 and/or the spring constant of the spring 5, the relation changes as shown by the solid line or the broken line in FIG. 10. Accordingly, when the spring 5 is changed or the resiliency of the spring 5 changes with age, the relation between the actual tension applied to the tape 1 and the level of the detecting signal of the angle detecting device 4 changes.

In order to overcome such a problem, conventionally, the zero position of the detecting signal is adjusted or the output gain of the tensiometer is adjusted.

Recently, numerical control has come into wide use in various fields for the purpose of improving accuracy in control and reducing the cost. Also in the tape takeup system, this applicant has proposed in U.S. Pat. No. 4,977,466 to control the system by use of numerical control.

When the numerical control is employed in controlling the tension on the tape, the level of the detecting signal of the angle detecting device 4 is once converted into a numerical value and the numerical value is fed to the tension control section. The numerical value is converted into a value of tension on the basis of a predetermined formula or a predetermined table stored in a memory.

In the numerical control, change in the initial length of the spring or the spring constant can be compensated for by rewriting the formula or the table instead of zero position adjustment or the gain adjustment.

However, when the operator measures the signal level for a reference tension and writes the formula or the table calibrated on the basis of the result of the measurement in the memory each time the spring is changed or every predetermined time, the labor involved is great and at the same time the calibrating time cannot be shortened.

SUMMARY OF THE INVENTION

In view of the foregoing observations and description, the primary object of the present invention is to provide a tape takeup system in which the tension applied to the tape during takeup of the tape is controlled by numerical control and the tensiometer which detects the tension on the tape can be calibrated easily in a short time.

A tape takeup system in accordance with the present invention comprises a tape tension detecting means which outputs a numerical value which changes in proportion to the tension applied to the tape, a converting means which converts the numerical value into a value of tension according to a predetermined formula, a torque control means which controls the rotational torque of at least one of the tape supply reel and the takeup reel so that the tension applied to the tape converges on a target tension on the basis of comparison of the value of tension represented by the numerical value output from the tape tension detecting means and the target tension, a formula changing means which, when a known tension is applied to the tape, stores in a memory the value of the known tension and the numerical value which is output from the tape tension detecting means upon application of the known tension, and changes said predetermined formula on the basis of the value of the known tension and the numerical value corresponding to the known tension stored in the memory, a first switch for causing the torque control means to interrupt the control of the rotational torque, a second switch for causing the formula changing means to store in the memory the numerical value output from the tape tension detecting means when a known tension is applied to the tape while the control of the rotational torque by the torque control means is interrupted and inputting the value of a known tension into the formula changing means, and a third switch for permitting the torque control means to resume the control of the rotational torque.

With this arrangement, when the tensiometer is to be calibrated, the operator has only to apply a known tension to the tape and operate the first to third switches. Further since the system is controlled by numerical control, the tape tension can be controlled with a high accuracy.

BRIEF DESCRIPTION OF THE DRAWINGS

FIGS. 1A to 1C are views for illustrating the key switches to be depressed upon calibration of the tensiometer and the state of the tensiometer upon depression of the respective key switches in the a tape takeup system in accordance with an embodiment of the present invention.

DESCRIPTION OF THE PREFERRED EMBODIMENT

Figure 2:
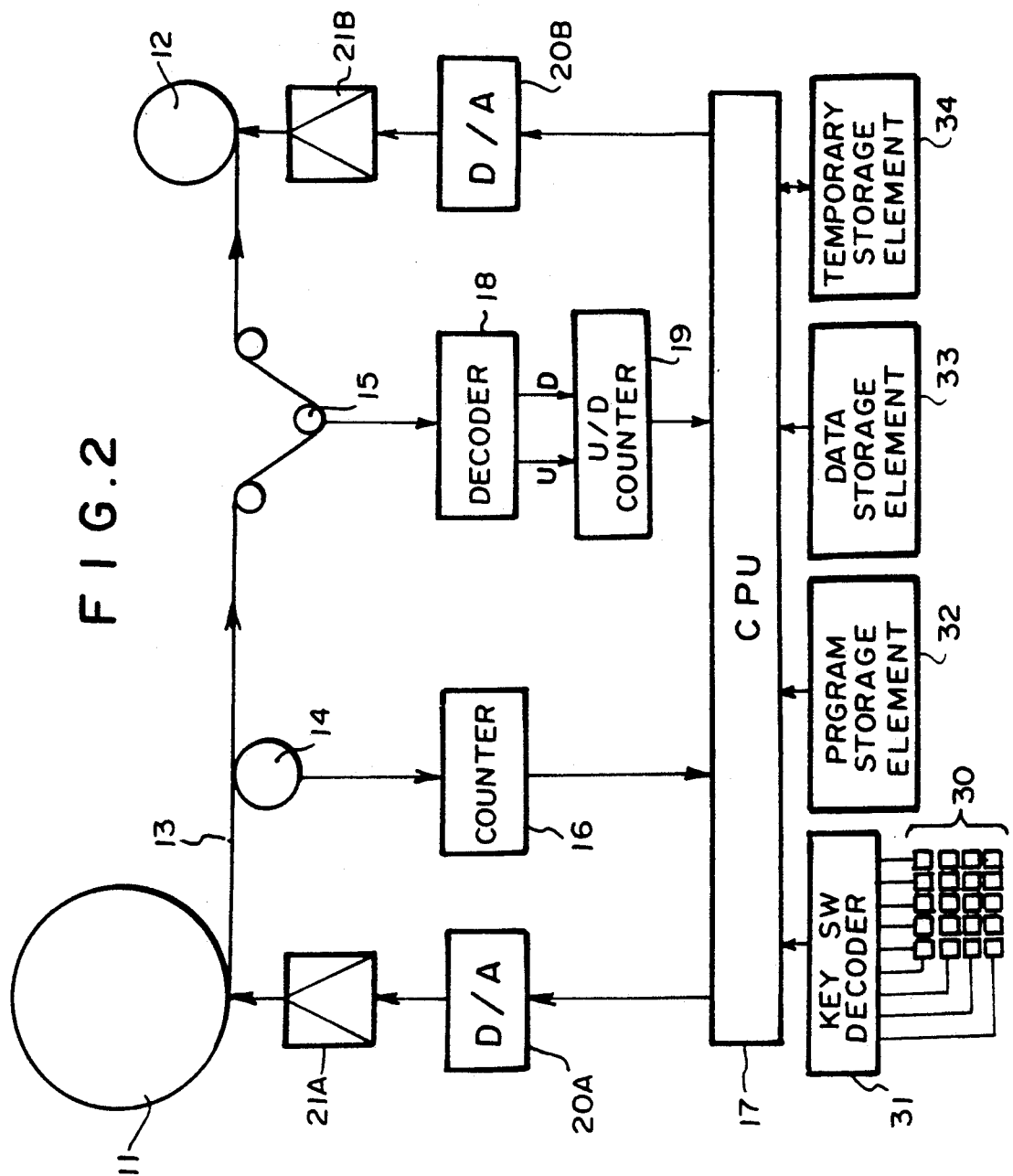
FIG. 2 is a schematic view showing the tape takeup system.

In FIG. 2, a tape takeup system in accordance with an embodiment of the present invention comprises a feed roll 11 which feeds out tape 13 in continuous length and a takeup roll 12 which takes up the tape 13. The tape speed is detected by a tape speed detector 14 and the tension applied to the tape 13 is detected by a tensiometer 15. The tape speed and the tension applied to the tape 13 are controlled on the basis of the detected values.

The tape speed detector 14 has therein a rotary encoder (not shown) which rotates at a speed proportional to the tape speed and outputs a pulse per a predetermined number of rotation of the rotary encoder. The number of pulses output from the tape speed detector 14 is integrated by a counter 16 at regular intervals (every 2 msec), and the integrated value is output to a CPU 17.

That is, a value corresponding to the tape running rate for a predetermined time is input into the CPU 17.

Figure 3:
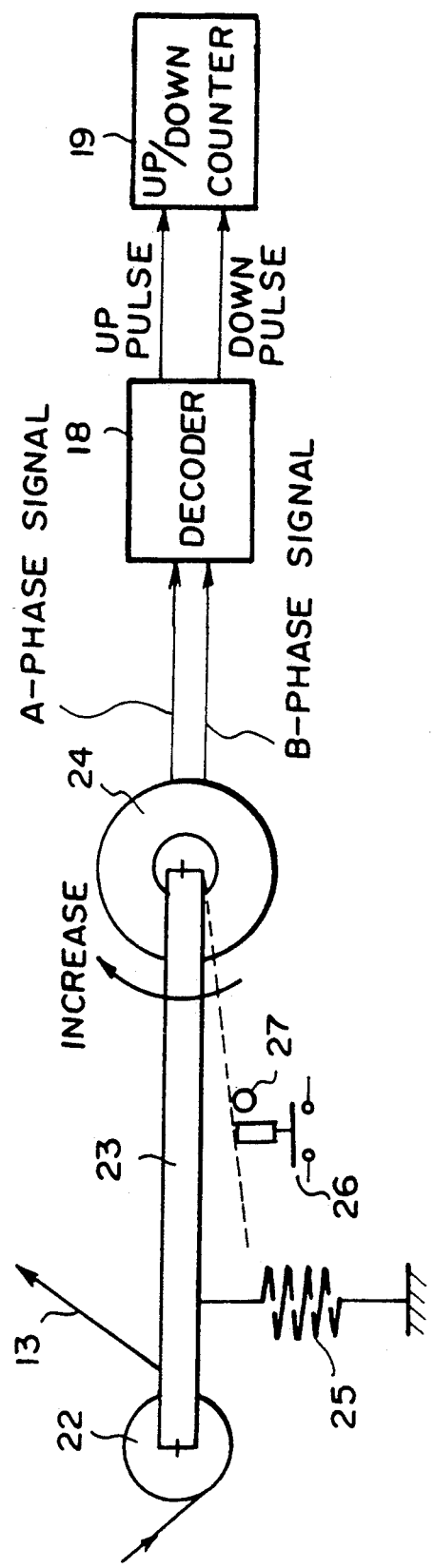
FIG. 3 is a schematic view showing in more detail the tensiometer employed in the tape takeup system.

As shown in FIG. 3, the tensiometer 15 comprises a tension detecting roller 22 around which the running tape 13 is passed, a tension arm 23 one end of which is supported for rotation on the tension detecting roller 22 at the center thereof and the other end of which is fixed to an angle detecting device (an incremental rotary encoder) 24 at the center thereof, a spring 25 which urges downward the tension arm 23, an origin detecting switch 26 and a stopper 27.

Figure 4:
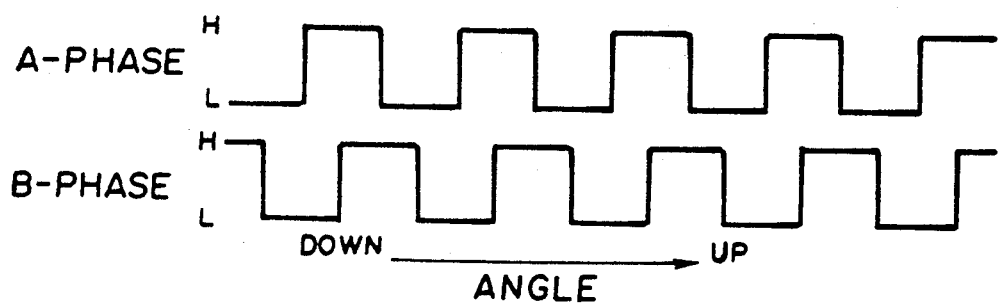
FIG. 4 is a view showing the output signals of the angle detecting device employed in the tensiometer shown in FIG. 3.

The angle detecting device 24 rotates in a direction depending on the tension applied to the tape 13, and outputs a pair of signals (A-phase signal and B-phase signal) with a phase lag of $\pi/2$ as shown in FIG. 4. The signals are input into a decoder 18 and the decoder 18 outputs an UP-pulse or a DOWN-pulse depending on the change in the state of the signals.

Figures 5, 6:
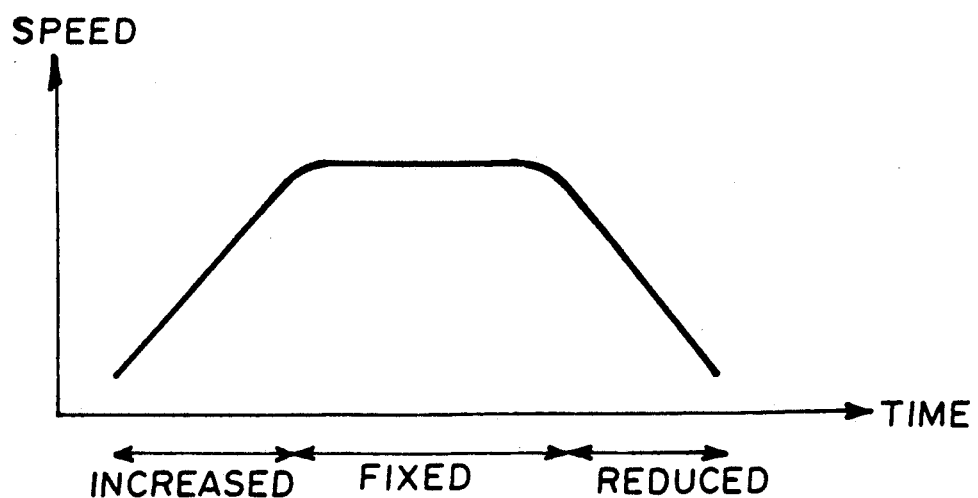
FIG. 5 is a table showing the relation between the pulse output from the decoder and the state of the signals output from the angle detecting device.
FIG. 6 is a graph showing the speed command value pattern according to which the tape speed is controlled.

The relation between the pulse output from the decoder 18 and the state of the signals output from the angle detecting device 24 is shown in FIG. 5.

The UP-pulses and the DOWN-pulses output from the decoder 18 are input into an UP/DOWN counter 19 and the number of the pulses are integrated by the UP/DOWN counter 19. Thus the rotational angle of the angle detecting device 24 is represented by a numerical value. The numerical value is input into the CPU 17. Since the rotational angle of the angle detecting device 24 represents the tension on the tape 13, the CPU 17 can know the measured value of the tension through the numerical value.

The CPU 17 controls the rotational speed of the feed roll 11 so that the tape speed conforms to the speed command value pattern shown in FIG. 6.

Figure 7:
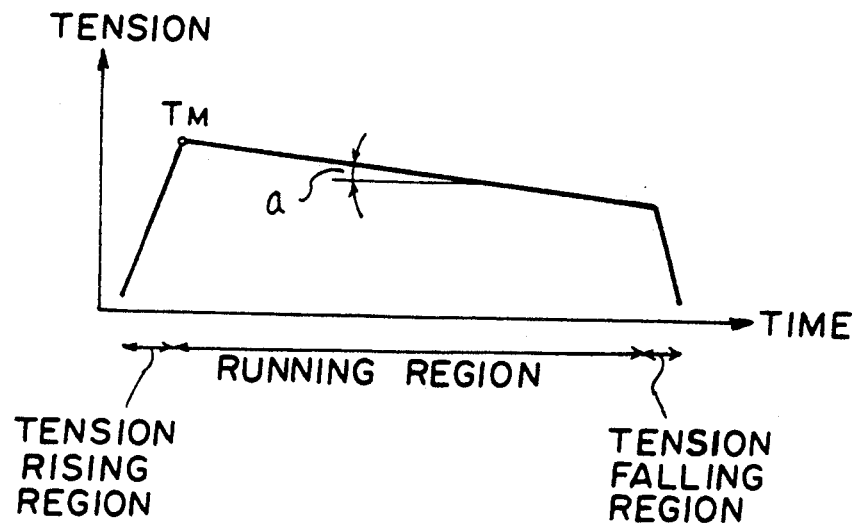
FIG. 7 is a graph showing the tension command value pattern according to which the tension applied to the tape is controlled.

Further the CPU 17 controls the rotational torque of the takeup roll 12 so that the tension applied to the tape 13 conforms to the tension command value pattern shown in FIG. 7.

Further the CPU 17 watches the state of various sensors (not shown) and outputs predetermined signals to, for instance, a solenoid valve for an air cylinder for controlling supply of a cassette half and the like in order to effect sequence control.

The command signals for driving the rolls 11 and 12 output from the CPU 17 are input into motor drivers 21A and 21B through D/A convertors 20A and 20B. The motor drivers 21A and 21B deliver an electric current or voltage determined on the basis of the signals to the driving motors of the rolls 11 and 12.

A key switch decoder 31 which outputs numerical data corresponding to a key switch 30 depressed, a program storage element 32 which stores the control program of the system, a data storage element 33 which stores data detected, and a temporary storage element 34 which temporarily stores detected data are connected to the CPU 17.

Since the measured value of the tension applied to the tape 13 is represented by the numerical value output from the UP/DOWN counter 19 which is proportional to the angle of rotation of the angle detecting device 24 and the tension to be applied to the tape 13 is expressed in terms of tension as shown in FIG. 7, the numerical value must be converted to the value of tension or the tension in the tension command value pattern shown in FIG. 7 must be converted to the numerical value in order to control the rotational torque of the takeup roll 12 so that the tension applied to the tape 13 conforms to the tension command value pattern.

Figure 8:
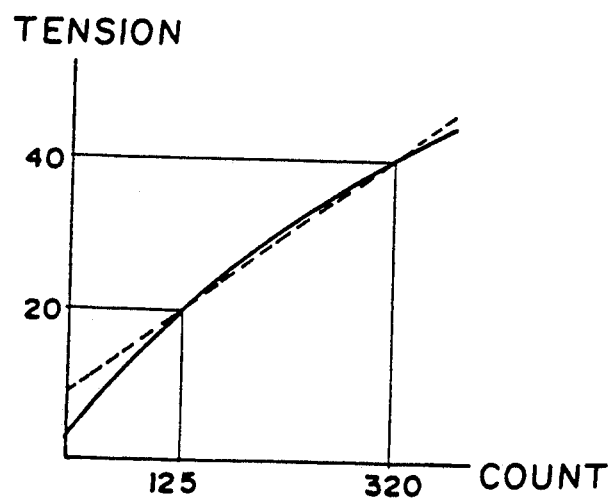
FIG. 8 is a graph showing the manner for converting the output of the Up/DOWN counter to the value of tension.
Figure 9:
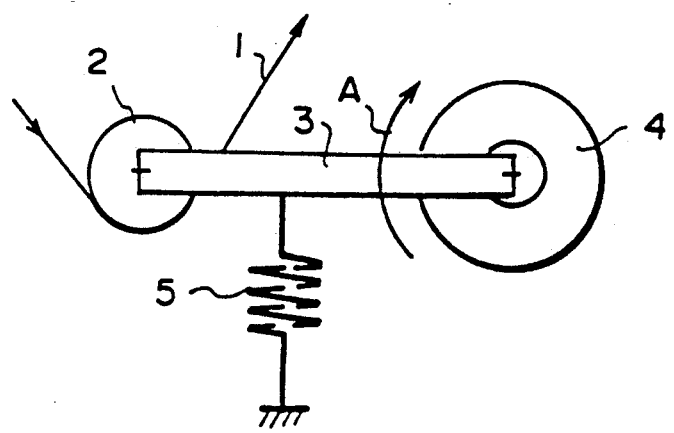
FIG. 9 is a schematic view showing the tensiometer employed in a tape takeup system of a prior art.
Figure 10:
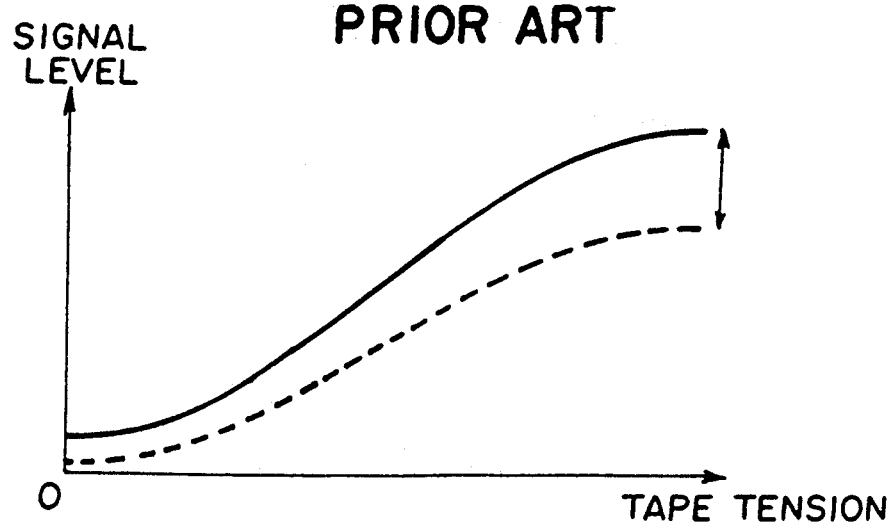
FIG. 10 is a graph showing change in the output characteristic of the tensiometer with change in the spring constant.

For example when the output characteristic of the tensiometer 15 is as shown by the solid line in FIG. 8, the output characteristic can be approximated to that shown by the linear broken line in FIG. 8 in the range where the tension is not smaller than 20 g and not larger than 40 g. (In this embodiment, the tension to be applied to the tape 13 is not smaller than 20 g and not larger than 40 g.

Accordingly, when the outputs of the UP/DOWN counter 19 upon application of tension of 20 g and 40 g (known values) have been known, the tension T (g) to be applied to the tape 13 can be converted into a value C of the output of the UP/DOWN counter 19 (i.e., into a numerical value) according to the following formula.

$$C = 125 + (T-20) \times (320-125)/(40-20) \quad (1)$$

The following formula may be employed instead of formula (1).

$$C = 320 - (40-T) \times (320-125)/(40-20) \quad (1')$$

In the tension command value pattern shown in FIG. 7, the tension to be applied to the tape 13 at each moment T(t) in the running region is given by the following formula.

$$T(t) = T_M + a \cdot t \tag{2}$$

wherein $T_M$ represents the maximum tension to be applied, t represents the time in second as measured from the time at which the tension to be applied is the maximum and a represents the inclination at which the tension to be applied is reduced (g/sec). The tension to be applied to the tape 13 at each moment T(t) is converted into the numerical Value C(t) by substituting $T_M + a \cdot t$ in formula (2) for T in formula (1) as follows.

$$C(t) = 125 + (T_M + a \cdot t - 20) \times (320 - 125)/(40 - 20) \tag{3}$$

The maximum tension to be applied $T_M$ is, for instance, 32 g and the inclination a is, for instance, $-1$.

Thus the CPU 17 controls the rotational torque of the takeup roll 12 on the basis of the comparison of the numerical value output from the UP/DOWN counter 19 at each time with the numerical value obtained from formula (3).

Change in the properties of the spring 25 can be compensated for by rewriting formula (1).

That is, when calibrating tensiometer 15, the output of the UP/DOWN counter 19 upon application of a tension of 40 g is counted and the numerical value corresponding to the output of the UP/DOWN counter 19 is substituted for 320 in formula (1), and at the same time, the output of the UP/DOWN counter 19 upon application of a tension of 20 g is counted and the numerical value corresponding to the output of the UP/DOWN counter 19 is substituted for 125 in formula (1).

In the system of this embodiment, the calibration is carried out in the following manner.

Four of the key switches 30 which are respectively indicated at "T0", "T1", "T2" and "Set" in FIGS. 1A to 1C are operated to carry out the calibration. When the calibration is to be carried out, the key switch T0 is first depressed, whereby the CPU 17 interrupts the control. Then that the tension arm 23 is in the zero position is checked by the origin detecting switch 26 and the counter 19 is reset as shown in FIG. 1A. Then, as shown in FIG. 1B, the tension arm 23 is moved by a weight of 20 g and then the key switch T1 is depressed. In response to depression of the key switch T1, the numerical value output from the UP/DOWN counter 19 is stored in the temporary storage element 34 as well as the tension at that time, i.e., 20 g. Further as shown in FIG. 1C, the tension arm 23 is moved by a weight of 40 g and then the key switch T2 is depressed. In response to depression of the key switch T2, the numerical value output from the UP/DOWN counter 19 is stored in the temporary storage element 34 as well as the tension at that time, i.e., 40 g. The numerical values stored in the temporary storage element 34 in response to depression of the key switches T1 and T2 are updated each time the key switches T1 and T2 are depressed. When the key switch Set is depressed, the numerical values stored in the temporary storage element 34 are fixed, and the CPU 17 rewrites formula (1) by substituting the numerical values stored in the temporary storage element 34 for 320 and 125, and at the same time the CPU 17 is permitted to resume the torque control.

Though, in the embodiment described above, the change in tension to be applied to the tape 13 during the tape takeup operation is given by a formula, it may be given in various forms. For example, it may be given by a table in which the tension to be applied to the tape 13 calculated according to a formula like formula (2) at regular intervals are tabulated.

Further, though, in the embodiment described above, the output characteristic of the tensiometer 15 is approximated to a linear line joining two points and the numerical values output from the UP/DOWN counter 19 corresponding to two known values of tension are used to calibrate the formula for converting the numerical value into the value of tension, the output characteristic of the tensiometer 15 may be approximated to a broken line joining three or more points. In such a case, the numerical values output from the UP/DOWN counter 19 corresponding to three of more known values of tension should be detected upon the calibration. When the output characteristic of the tensiometer 15 can be approximated to a linear line joining one point and the origin, detection of the numerical value corresponding to only one known value of tension is necessary.

What is claimed is;

1. A tape takeup system for taking up tape fed out from a tape supply reel around a takeup reel while controlling the tension applied to the tape comprising
   a tape tension detecting means which outputs a numerical value which changes in proportion to the tension applied to the tape,
   a converting means which converts the numerical value into a value of tension according to a predetermined formula,
   a torque control means which controls the rotational torque of at least one of the tape supply reel and the takeup reel so that the tension applied to the tape converges on a target tension on the basis of comparison of the value of tension represented by the numerical value output from the tape tension detecting means and the target tension,
   a formula changing means which, when a known tension is applied to the tape, stores in a memory the value of the known tension and the numerical value which is output from the tape tension detecting means upon application of the known tension, and changes said predetermined formula on the basis of the value of the known tension and the numerical value corresponding to the known tension stored in the memory,
   a first switch for causing the torque control means to interrupt the control of the rotational torque,
   a second switch for causing the formula changing means to store in the memory the numerical value output from the tape tension detecting means when a known tension is applied to the tape while the control of the rotational torque by the torque control means is interrupted and inputting the value of a known tension into the formula changing means, and
   a third switch for permitting the torque control means to resume the control of the rotational torque.

* * * * *